(12) United States Patent
Robert

(10) Patent No.: US 8,511,332 B2
(45) Date of Patent: Aug. 20, 2013

(54) ASYMMETRIC VALVE FOR VEHICLE WHEEL

(75) Inventor: Aurelien Robert, Pontarlier (FR)

(73) Assignee: Schrader SAS, Pontarlier (FR)

( * ) Notice: Subject to any disclaimer, the term of this patent is extended or adjusted under 35 U.S.C. 154(b) by 0 days.

(21) Appl. No.: 13/379,130

(22) PCT Filed: Jun. 24, 2010

(86) PCT No.: PCT/FR2010/051292
§ 371 (c)(1),
(2), (4) Date: Dec. 19, 2011

(87) PCT Pub. No.: WO2010/149933
PCT Pub. Date: Dec. 29, 2010

(65) Prior Publication Data
US 2012/0103432 A1 May 3, 2012

(30) Foreign Application Priority Data
Jun. 25, 2009 (FR) ...................................... 09 54328

(51) Int. Cl.
F16K 15/20 (2006.01)
B60C 29/00 (2006.01)

(52) U.S. Cl.
USPC ............................ 137/227; 137/231; 152/427

(58) Field of Classification Search
USPC ................. 137/227, 231; 251/150; 152/427, 152/428
See application file for complete search history.

(56) References Cited

U.S. PATENT DOCUMENTS

| 2,835,304 A * | 5/1958 | Lee ............................... 152/427 |
| 2,928,448 A | 3/1960 | Hosking |
| 3,368,603 A | 2/1968 | Kuzyn |
| 7,086,412 B2 * | 8/2006 | Uleski ........................... 137/223 |
| 2010/0171361 A1 | 7/2010 | Monjuvent et al. |

FOREIGN PATENT DOCUMENTS

FR 2903752 A1 1/2008

* cited by examiner

Primary Examiner — John K Fristoe, Jr.
Assistant Examiner — Kevin E Lynn
(74) Attorney, Agent, or Firm — Bachman & LaPointe, P.C.

(57) ABSTRACT

A valve of the "Snap-In" type is intended to be mounted directly on the rim of a vehicle wheel fitted with a "tubeless" tire. The valve is secured to the rim through which it passes via a groove produced at the base of a bulb extended by a rubbery coating of an internal nozzle of the valve. The groove collaborates elastically with a hole in the rim, on the periphery of which hole it becomes lodged, the mass or the volume of the bulb being smaller in its region (A) toward the interior of the rim by comparison with its region (B) directed toward the exterior, this reduction taking place near the groove intended to collaborate with the hole in the rim, both in the part thereof that surrounds the nozzle and in the part thereof that is in contact with the bottom of the rim.

4 Claims, 3 Drawing Sheets

ASYMMETRIC VALVE FOR VEHICLE WHEEL

BACKGROUND

This invention relates to a valve intended to be mounted directly on the rim of a vehicle wheel fitted with a "tubeless" tire.

Such a valve is secured to the rim through which it passes and it is known to carry it out using a threaded metal socket passing through the rim, and immobilized by a nut, by the intermediary of a seal.

This has the disadvantage of having a high cost due to the multi-component effect, i.e. a nut, a seal and a valve. This also necessarily generates multiple manipulations during mounting or dismounting.

Valves of the "Snap-In" type are also known, secured to the rim through which they pass by the intermediary of a groove produced at the base of a bulb extended by a rubbery coating of an internal nozzle of the valve, said groove cooperating elastically with a hole in the rim on the periphery of which it becomes housed by force, thanks to the elastic deformation of the groove.

As such the valve can be mounted in a single operation, and without having recourse to intermediary elements such as the nut and the seal.

Nevertheless, tests have made it possible to observe a certain degree of instability of the valve, and even more so when the internal portion of the valve is associated to a pressure sensor box, which increases the mass of the device, and more particularly at high speed.

In this case, the centrifugal force destabilizes the unit due to the tendency to raise the box in the direction of the periphery of the wheel, and consequently, to exert an additional constraint on the rubber of the valve, on the hole in the rim. It has been observed that this results in shearing effects and the initiation of breakage of the rubber comprising the valve, having for consequence to cause leaks that damage the seal of the wheel.

The tests have demonstrated that these detrimental effects due to the centrifugal force take place in the upper portion of the bulb and of the groove of the valve, on the hole in the rim.

It may have been thought to remedy this problem by increasing the thickness of the rubber on the bulb and on the groove, or its hardness over the entire periphery of the groove cooperating with the periphery of the hole in the rim. But this would imply an additional introduction effort during the mounting of the valve in the hole in the rim.

SUMMARY OF THE INVENTION

According to a first phase of the inventive approach, it was determined that it was necessary to treat differently the external region of the valve on the hole in the rim, from its internal portion.

A compromise was therefore sought on the bulb and on the groove due to the dissymmetric forces with the periphery of the hole in the rim.

It was also observed that, when the hole in the rim was too close to the bottom of the rim, the bulb, in its internal portion, had the tendency to undergo constraints that were higher than in its external portion.

To resolve this, it was imagined to also reduce the volume of the bulb in this internal region directed toward the bottom of the rim.

In other words, the lessening of this second portion of the bulb also contributes in reducing, in a global manner, the internal region, to the benefit of the external region.

Using these thoughts, and in order to resolve the aforementioned problems, this invention relates to a valve of the "Snap-In" type intended to be mounted directly on the rim of a vehicle wheel fitted with a "tubeless" tire, said valve being secured to the rim through which it passes by the intermediary of a groove, produced at the base of a bulb extended by a rubbery coating of an internal nozzle of the valve, said groove cooperating elastically with a hole in the rim, on the periphery of which it becomes housed, characterized in that the volumetric mass of the bulb is smaller in its region directed toward the interior of the rim, by comparison with its region directed toward the exterior, this reduction taking place in the vicinity of the groove, intended to cooperate with the hole in the rim, in its portion that surrounds the nozzle as well as in its portion in contact with the bottom of the rim.

An asymmetric valve was as such created, of a mass that is different in its external portion directed toward the exterior of the rim in relation to its internal portion directed toward the interior of the rim, resolving the two-fold problem posed.

The invention further relates to the characteristics that shall be revealed in the following description, and which must be considered separately or according to all of their possible technical combinations.

BRIEF DESCRIPTION OF THE DRAWINGS

This description provided by way of a non-restrictive example, will provide a better understanding of how the invention can be carried out in reference to the annexed drawings wherein.

DETAILED DESCRIPTION

Figure 1:
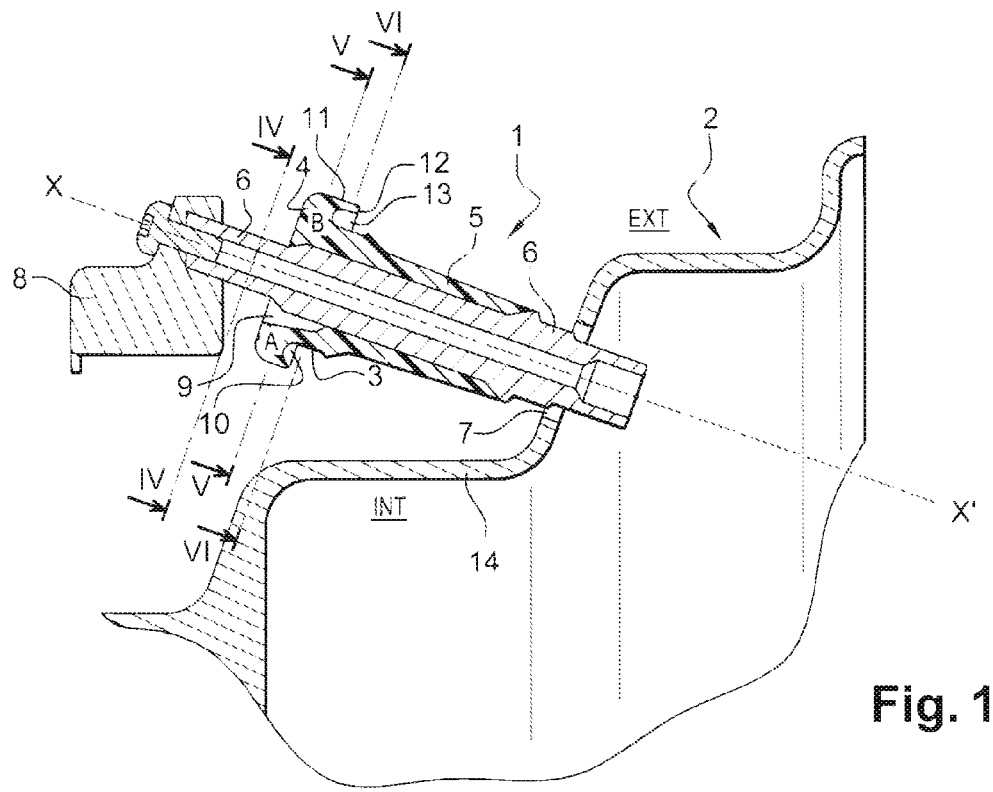
FIG. 1 shows a longitudinal cross-section view of a valve according to the invention, associated, by way of an example embodiment, to a pressure sensor housed in a box located inside the rim, before mounting.
Figure 2:
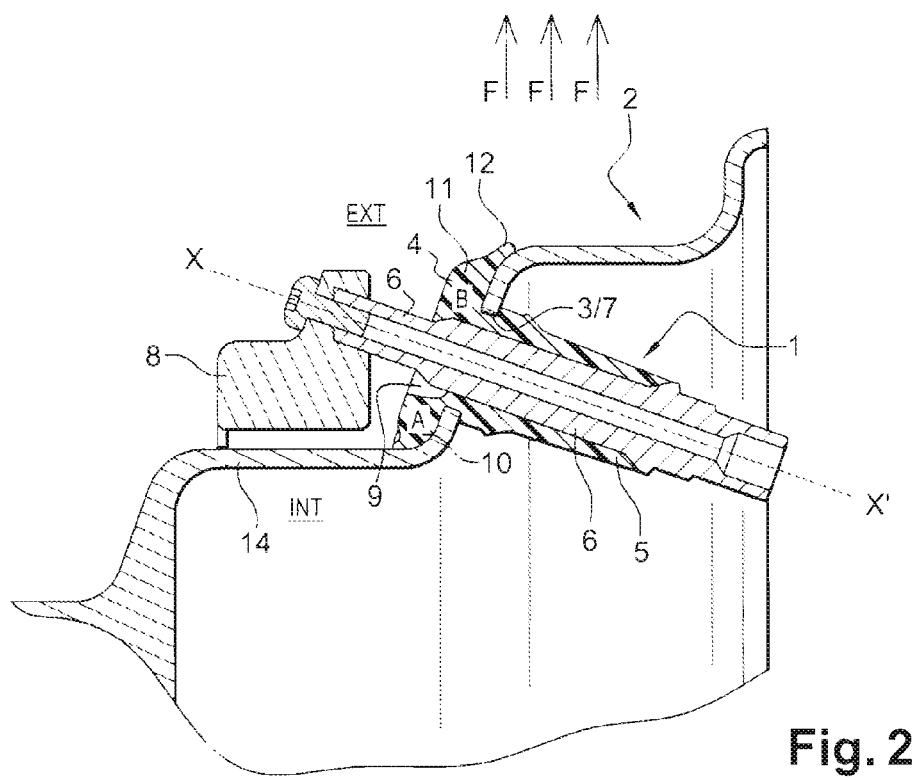
FIG. 2 shows a device according to FIG. 1, after mounting on the rim.
Figure 3:
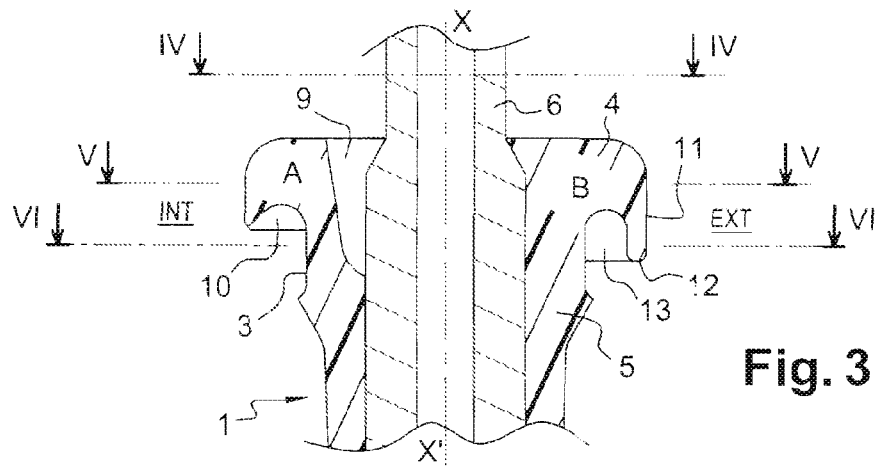
FIG. 3 shows, on an enlarged scale, the upper region of the asymmetric valve, for a better understanding of the invention.
Figure 4:
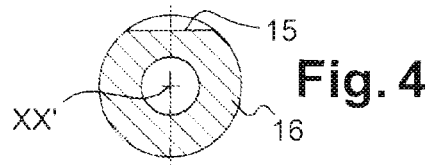
FIG. 4 is a cross-section view acccording to the line IV-IV of FIGS 1 and 3.
Figure 5:
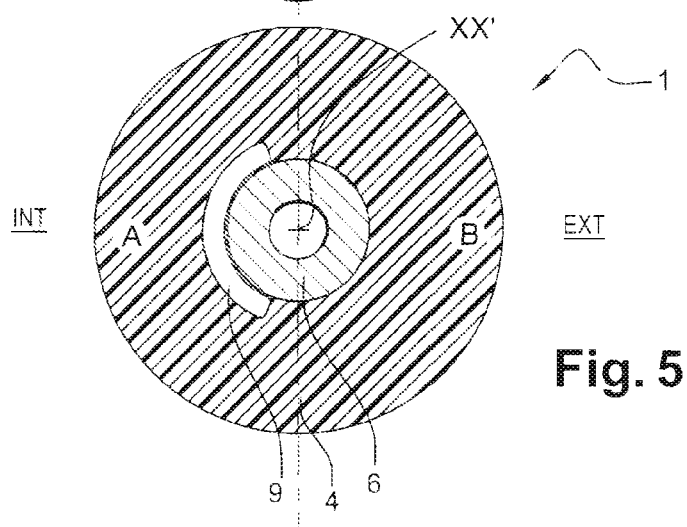
FIG 5 is a transveral cross-section view, on a enlarged scale, according to the line V-V of FIGS 1 and 3.
Figure 6:
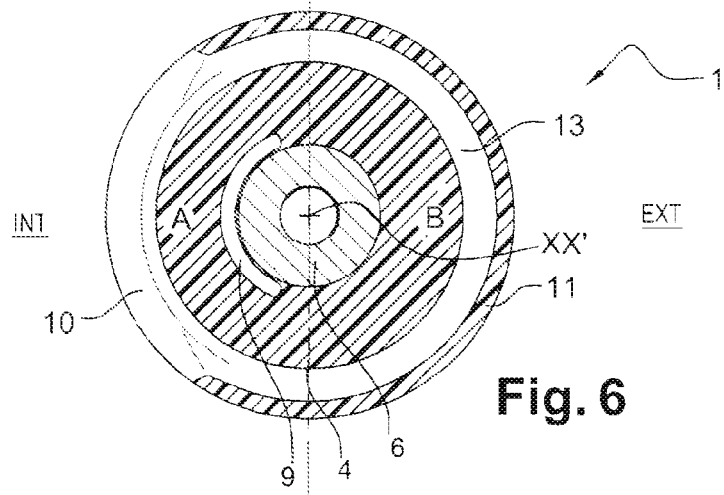
FIG 6 is a transversal cross-section view, on an enlarged scale, according to the line VI-VI of FIGS 1 and 3.
Figure 7:
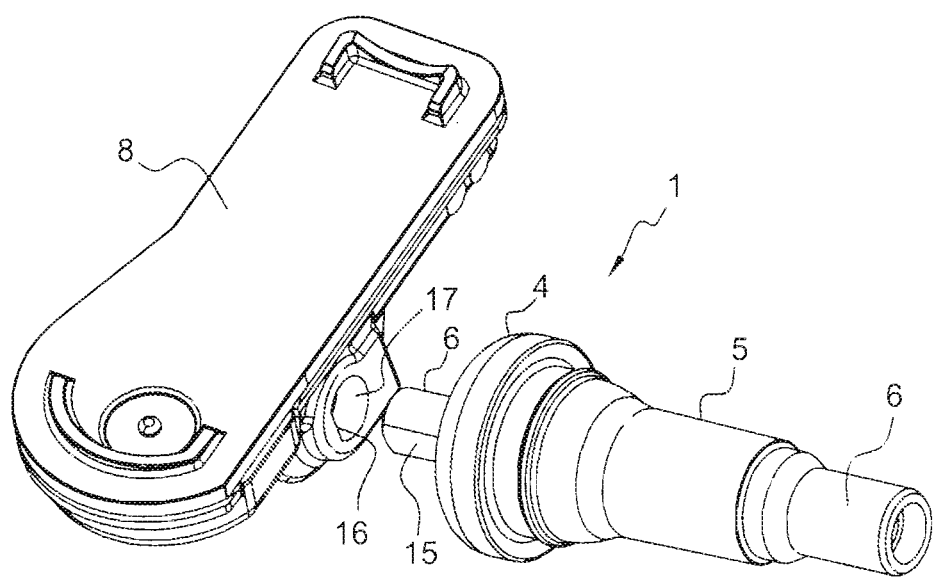
FIG 7 shows the means for indexing the valve in relation to the pressure sensor box.

The valve 1 globally designated in FIGS. 1 and 2 is of the "Snap-In" type, intended to be mounted directly on the rim 2 of a vehicle wheel fitted with a "tubeless" tire.

The valve 1 is secured to the rim 2 through which it passes by the intermediary of a groove 3 produced at the base of a bulb 4 extended by a rubbery coating 5 of an internal nozzle 6 of the valve 1. Said groove 3 cooperates elastically with a hole 7 in the rim 2, on the periphery of which it becomes housed.

According to this non-restricted embodiment, the valve 1 is associated with a pressure sensor housed in a box 8 located inside the tire.

According to the invention, the volumetric mass of the bulb 4 is smaller in its region "A" directed toward the interior "INT" of the rim 2, by comparison with its region "B"

directed towards the exterior "EXT", this reduction taking place in the vicinity of the groove 3, intended to cooperate with the hole 7 in the rim 2, in its portion that surrounds the nozzle 6 as well as in its portion in contact with the bottom 14 of the rim 1.

As can be seen well in the figures, the portion of the bulb 4 that surrounds the nozzle 6 has, in its lower region "A" directed toward the interior "INT" of the rim 2, a blind coaxial recess 9, extending according to a circular sector, in such a way as to decrease its mass in this region, while still increasing it in its region "B" directed toward the exterior "EXT", diametrically opposite.

Moreover, according to another characteristic of the invention, the internal peripheral portion of the bulb 4 is comprised of a flange ring 11 defining a corresponding lip 12, delimiting an annular partial groove 13, having, in its lower region "A" directed toward the interior "INT" of the rim 2, intended to come into contact with the bottom 14 of the rim 2, a reduction 10 of the lip 12, in the direction of its height, in such a way as to reduce its mass and to facilitate its application on said bottom 14 of the rim 2, when the mounting hole 7 of the valve 1 in the latter is too close, and not offering the lip 12 a flat surface over its entire surface.

According to an alternative embodiment, the internal peripheral portion of the bulb 4 has, in its lower region "A" directed toward the interior "INT" of the rim 2, intended to come into contact with the bottom 14 of the rim 2, a localized reduction 10 in its circumference, in such a way as to reduce its mass and to facilitate its application on said bottom 14 of the rim 2, when the mounting hole 7 of the valve 1 on the latter is too close, and not offering the bulb 4 a flat surface over its entire surface.

According to another characteristic, the valve 1 comprises means for indexing in relation to the rim, in such a way as to direct it according to the recess 9 and the reduction 10.

More precisely, the valve 1 is associated with a pressure sensor housed in a box 8, with the link between the valve 1 and the box 8 being carried out by the intermediary of the means for indexing constituted by at least one flat 15 made on the nozzle 6 of the valve 1, in correspondence with an additional flat 16 made in a housing 17 of the box 8, with the latter being positioned in relation to the rim 2, during mounting.

The invention claimed is:

1. A valve of a snap-in type intended to be mounted directly on a rim of a vehicle wheel fitted with a tubeless tire; said valve being secured to a hole in the rim through which the valve passes axially by the intermediary of a groove, produced at a base of a bulb of the valve, said bulb extended by a rubbery coating of an internal nozzle of the valve; said groove cooperating elastically with the hole in the rim, on the periphery of which said groove becomes housed, according to a longitudinal axis XX' of the valve, a reduction of the bulb being created by reducing the mass or the volume of the bulb, consequently lower, in a region of the bulb located under said longitudinal axis, directed toward an interior of the rim, consequently different by comparison with a region of the bulb located above the said longitudinal axis, toward an exterior of the rim, in order to define an asymmetric valve; said reduction of the bulb taking place in the vicinity of the groove, intended to cooperate with the hole in the rim; and said valve comprising means of indexing in such a way as to direct said reduction toward a bottom of the rim.

2. The valve according to claim 1, wherein the portion of the bulb that surrounds the nozzle has, in said first region located under said longitudinal axis, a blind coaxial recess, constituting said reduction which is a first reduction, extending according to a circular sector, in such a way as to reduce its mass or its volume in said first region, while still increasing said mass or volume in said second region, diametrically opposite.

3. The valve according to claim 1, wherein the internal peripheral portion of the bulb is comprised of a flange ring defining a corresponding lip, delimiting a partial annular groove, having, in said first region located under the longitudinal axis of the valve and intended to come into contact with the bottom of the rim, a second reduction of the lip, limited in the direction of its height, according to the longitudinal axis of the valve, and in the direction of its circumference, in such a way as to reduce said mass or said volume and to facilitate application on said bottom of the rim when the mounting hole of the valve in the rim is too close, and not offering the bulb a flat surface across its entire surface.

4. The valve according to claim 1, wherein the valve is associated with a pressure sensor housed in a box, a link between the valve and the box being carried out by the intermediary of the means of indexing constituted by at least one flat made on the nozzle of the valve, in correspondence with an additional flat made in a housing of the box, with the box being positioned in relation to the rim, during mounting.

* * * * *